INVENTORS
EDWARD J. ZOLA, JR.
KENNETH W. VAN MECHELEN
GENE J. COUR
WILLIAM L. McDERMID
BY Sughrue and Rothwell
ATTORNEYS INVENTORS
EDWARD J. ZOLA, JR.
KENNETH W. VAN MECHELEN
GENE J. COUR
WILLIAM L. McDERMID
BY Sughrue and Rothwell
ATTORNEYS INVENTORS
EDWARD J. ZOLA, JR.
KENNETH W. VAN MECHELEN
GENE J. COUR
WILLIAM L. McDERMID
BY Sughrue and Rothwell
ATTORNEYS INVENTORS
EDWARD J. ZOLA, JR.
KENNETH W. VAN MECHELEN
GENE J. COUR
WILLIAM L. McDERMID
BY Sughrue and Rothwell
ATTORNEYS

BINARY-TO-DIGITAL PULSE TRAIN CONVERTER

Filed June 30, 1958 7 Sheets-Sheet 5

INVENTORS
EDWARD J. ZOLA, JR.
KENNETH W. VAN MECHELEN
GENE J. COUR
WILLIAM L. McDERMID
BY
Sughrue and Rothwell
ATTORNEYS

BINARY-TO-DIGITAL PULSE TRAIN CONVERTER

Filed June 30, 1958 7 Sheets-Sheet 6

INVENTORS
EDWARD J. ZOLA, JR.
KENNETH W. VAN MECHELEN
GENE J. COUR
WILLIAM L. McDERMID
BY Sughrue and Rothwell
ATTORNEYS

BINARY-TO-DIGITAL PULSE TRAIN CONVERTER

INVENTORS
EDWARD J. ZOLA, JR.
KENNETH W. VAN MECHELEN
GENE J. COUR
WILLIAM L. McDERMID
BY Sughrue and Rothwell
ATTORNEYS

United States Patent Office 3,004,252

Patented Oct. 10, 1961

3,004,252

BINARY-TO-DIGITAL PULSE TRAIN CONVERTER

Edward J. Zola, Jr., Vestal, Kenneth W. Van Mechelen, Endicott, Gene J. Cour, Owego, and William L. McDermid, Vestal, N.Y., assignors to International Business Machines Corporation, New York, N.Y., a corporation of New York Filed June 30, 1958, Ser. No. 745,612

3 Claims. (Cl. 340—347)

This invention relates to an electronic converter and more particularly to a converter for providing a train of pulses having a total number of pulses therein which is an analogue of the number being converted.

In the system of this invention, a magnetic drum is provided having stored thereon a number of words. Each word is divided into 26 bit positions. The first two of these bits in the bit 1 and 2 positions are switching bits, and are ignored by this converter. The next bit, bit 3, is a sign bit which indicates whether the number to follow is a minus or plus number. The next four bits are the first four significant bits of the binary number. It is the conversion of these bits to which this invention is specifically directed.

The pulse train produced by the converter of this invention is used in the specific sense to energize relays, but such need not be the case. This train of pulses may be used to instrument any other utilization device called for by the specifications of the system. In addition, the drum storage may be substituted by any other equivalent type of storage.

It is broadly an object of this invention to provide a converter for converting a number represented by the presence or absence of pulses in significant bit positions thereof into a train of pulses totaling in number an analogue of the number being converted.

More specifically, it is an object of this invention to provide a converter for converting a binary number into a train of pulses totaling in number the decimal analogue of the binary number.

A further object of the invention is to provide a train of pulses at a relatively slow rate by converting a binary number whose bits occur at a relatively fast rate.

It is a specific object of this invention to read a word from a selected location on a magnetic drum, and to convert at least a portion of said word from the binary number represented thereby to a train of pulses having a total number of pulses equal to the decimal analogue of said binary number. The converter can be programed to provide such conversion for a plurality of words in succession.

These and other objects of the invention will become apparent from a more detailed description of the accompanying drawings.

Figure 1:
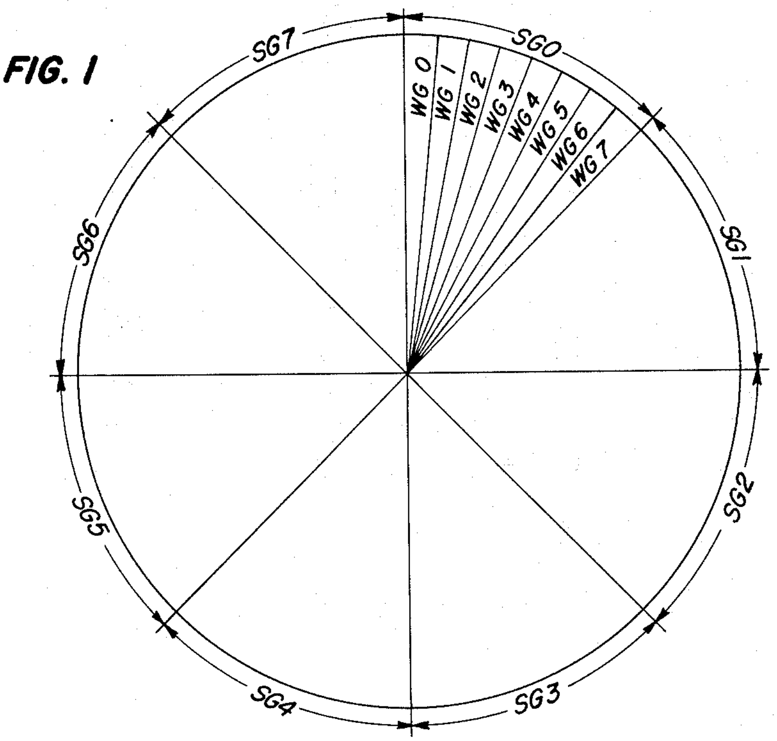
FIGURE 1 is a schematic illustration of the manner in which the magnetic drum is divided into a plurality of sectors, in this case eight, and each sector is divided into a plurality of word positions, in this case eight.

Referring to FIGURE 1, there is shown a cross section of a magnetic drum. The drum is divided into eight segments identified as SG0 to SG7, inclusive. Each segment is in turn divided into eight word locations, WG0 to WG7, inclusive. Each word contains 26 serial bit positions represented by the presence or absence of a bit in each position. During one revolution of the drum, eight segments containing 64 words are scanned. The converter of this invention is programmed to select any one or combination of words and to convert a plurality of significant binary bit positions therein into a train of pulses.

Figure 2:
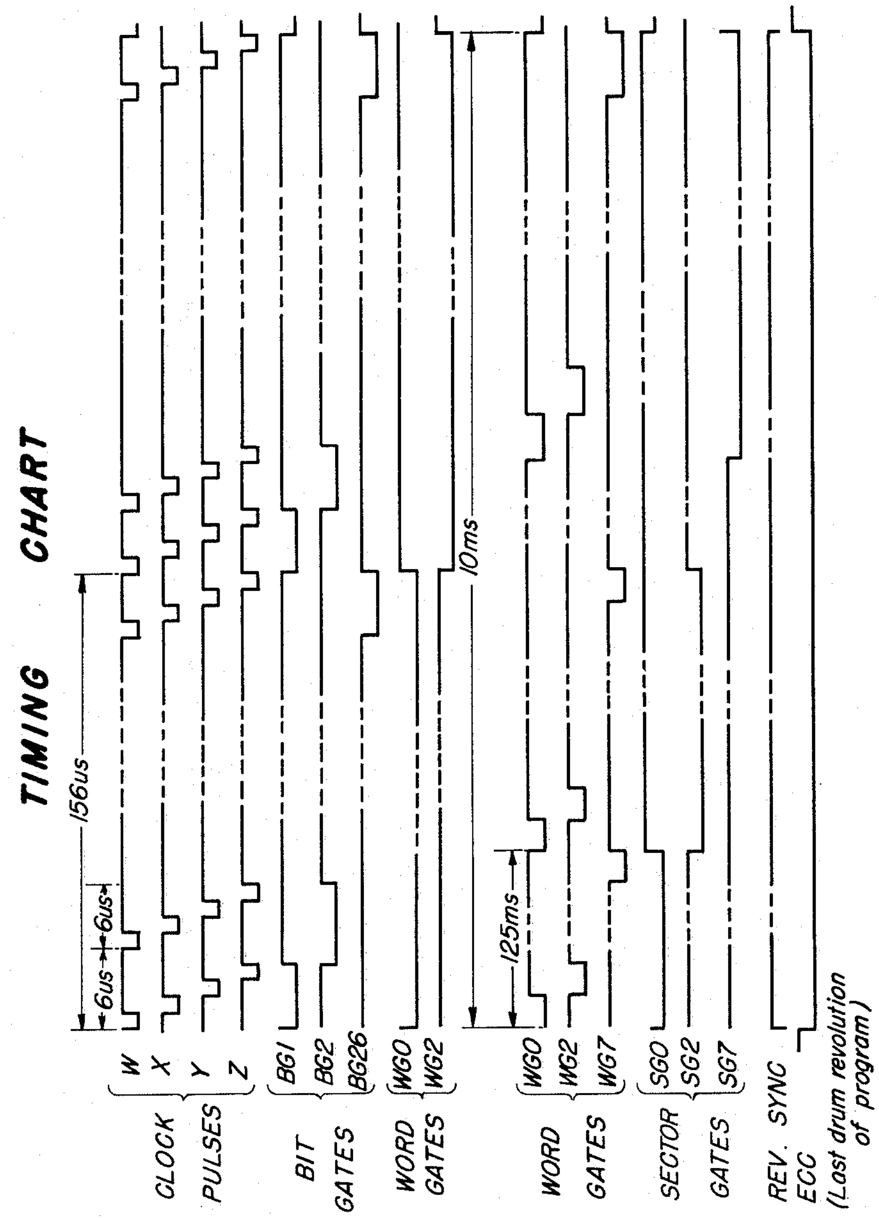
FIGURE 2 is a timing chart showing the relative pulse durations and time positions of the various timing gates used in the converter of this invention.

Referring to FIGURE 2, the timing chart, the clock pulses W, X, Y and Z are generated from information on the drum and a suitable pulse generator (not shown). The bit gate pulses are also generated from the drum by the pulse generator, and as has been stated above, there are 26 bit gates within each word gate, and four clock pulses within each bit gate. Each bit gate has a duration of approximately 6 microseconds. Each clock pulse has a duration of approximately 1.50 microseconds. Each word gate is approximately 156 microseconds in duration. Each sector gate is approximately 1.25 milliseconds in duration. One drum revolution is approximately 10 milliseconds in duration. At the end of the computer program an end of computation cycle pulse (ECC) is generated from the program control unit (not shown) of the computer and lasts for 63 word times. At the beginning of each drum revolution, a revolution sync pulse (RS) of extremely short duration is generated from the drum by the pulse generator.

Figure 3:
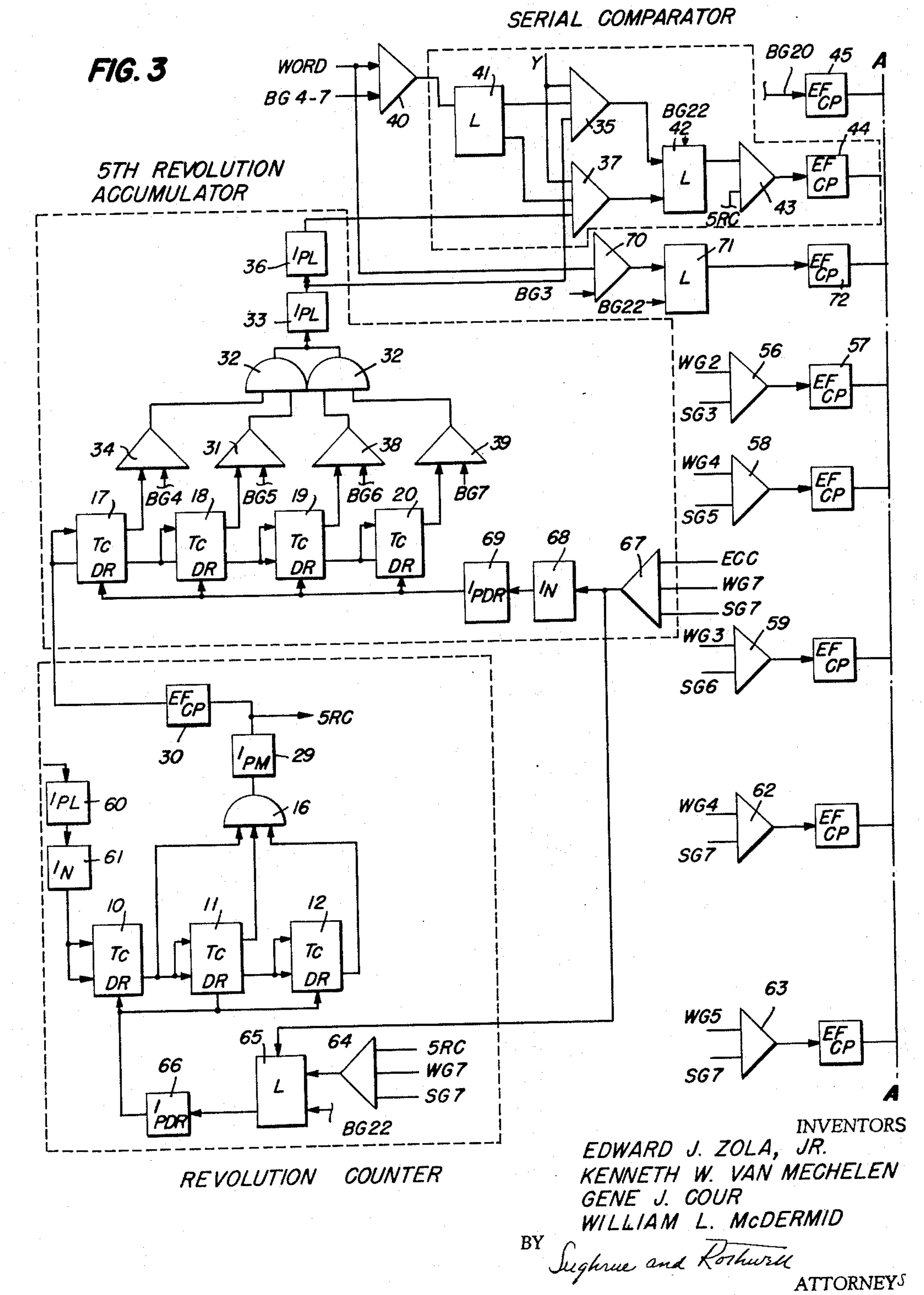
FIGURES 3 and 3A are diagrammatic illustrations of the logical circuit provided in accordance with this invention to function as the converter.

With the above in mind, let us now examine the logical circuit of FIGURE 3 which is to function as the converter of this invention.

Let us concentrate on word A which we arbitrarily select to be for illustration purposes word 2 in sector 3 of the drum. This corresponds to the gates WG2 and SG3. Let us first assume that the bit positions in the word are:

| BG7 | BG6 | BG5 | BG4 | BG3 | BG2 | BG1 |
|---|---|---|---|---|---|---|
| 1 | 1 | 0 | 1 | 1 | X | X |

*Chart No. 1*

The first two bit positions of the word, corresponding to BG1 and BG2, are employed by the computer as switching bits and are ignored by the converter. The third bit position, corresponding to BG3, is a sign bit, and its function will be explained later. Bits 4 to 7 inclusive, corresponding to BG4 and BG7 inclusive, contain the binary number to be converted by this invention. BG4 is the least significant bit of the word. Other significant positions of the number may be converted to a corresponding train of pulse, but for illustration purposes we are choosing bits 4 to 7, inclusive. In the example given, the decimal analogue of the binary number is 13. This means that the converter is to provide a train of thirteen pulses upon the input to the converter of this binary number.

Figure 3A:
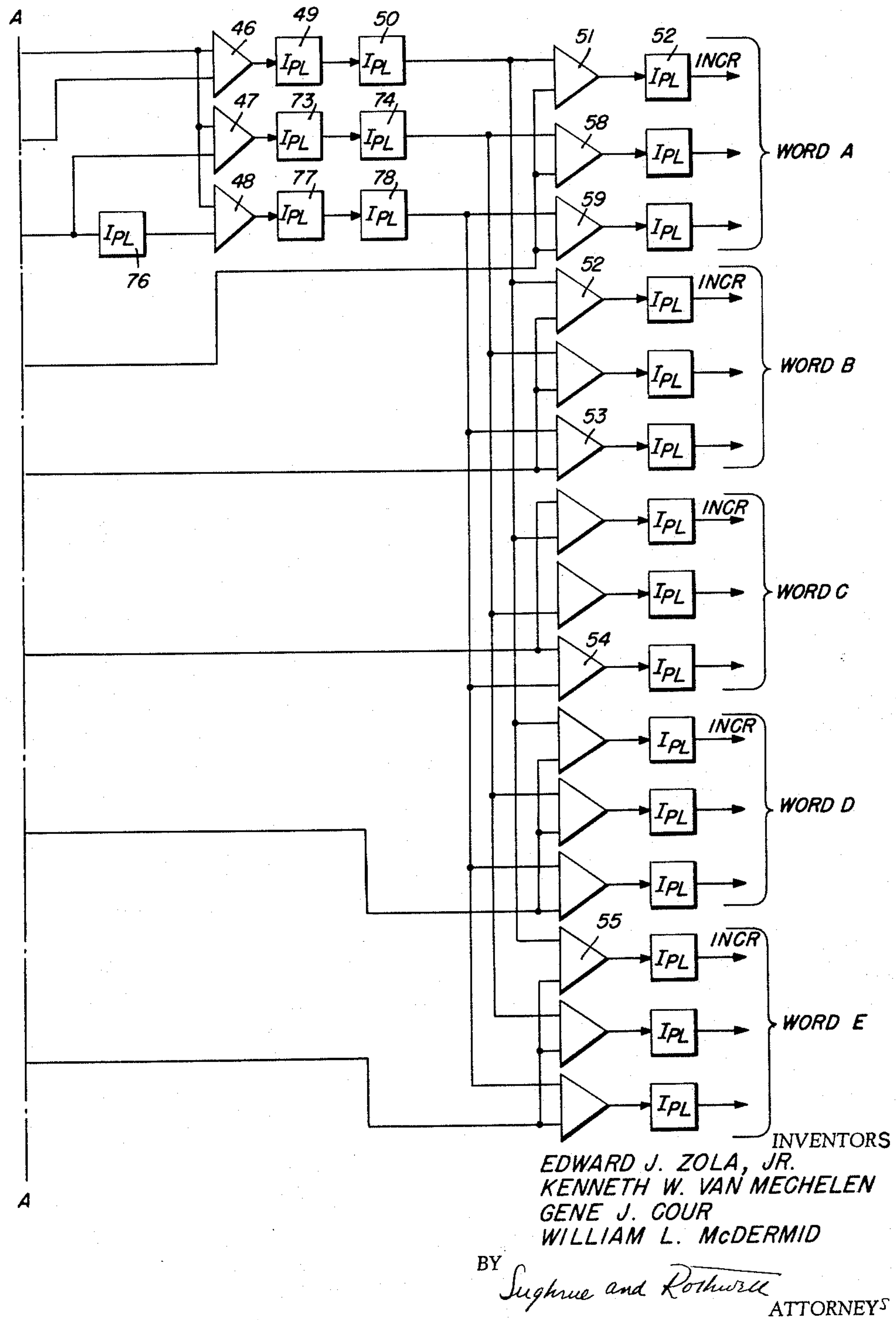

The latches employed in accordance with this invention are identified by the letter L in the drawing; and are bistable devices having a reset and a set input and a reset and a set output. As shown in FIGS. 3 and 3A, the reset inputs and outputs are opposite to each other towards the top of the box and the set input and set output are opposite each other at the bottom of the box. Only those inputs and outputs actually employed in the circuit are shown in FIGS. 3 and 3A. The latch functions as follows: The latch has two stable conditions or states, a set condition indicative of a binary "1," and a reset condition indicative of a binary "0." A set latch is reset only upon the application of a "1" to a reset input to provide a down or relatively negative voltage level at its reset output. A reset latch is set only upon the application of a "1" to its set input to provide a down level at its set output. A set latch is unaffected by succeeding applications of "1's" at its set input. A reset latch is similarly unaffected by succeeding applications of "1's" at its reset inputs. A specific circuit for such a latch as employed here will be illustrated in connection with a subsequent figure.

The AND gates are illustrated in FIGS. 3 and 3A as triangles and the OR gates as half moons.

As the drum rotates a negative revolution sync pulse (RS) is provided at the beginning of each revolution to inverter 60. The positive output from inverter 60 is inverted to a negative pulse by inverter 61. Binary triggers 10, 11 and 12 are reset prior to the first revolution of the drum. These triggers are identified in the drawings by Tc. A typical example of such a trigger will be illustrated in a subsequent figure. Trigger 10 is set by the first RS pulse to provide an up level from its Reset output to negative OR 16. At this time, the Set output of trigger 11 is up and the Reset output trigger 12 is down. Consequently, the output of OR 16 is down. The next RS pulse resets trigger 10 and sets trigger 11. The revolution counter including the three triggers 10, 11 and 12 continues to count the RS pulses until the fifth RS pulse is counted. At that time, trigger 10 is set, trigger 11 is reset, and trigger 12 is set. Therefore, all inputs to OR 16 are up. The output of OR 16 is then up and remains up for an entire revolution. During the fifth drum revolution the output of OR 16 is up and this up level is inverted by inverter 29 to provide a negative pulse output therefrom which is one revolution long. This pulse occurs during the entire fifth revolution of the drum and is identified as 5RC. Means are provided to reset triggers 10 to 12, inclusive, immediately before RS6 so that RS6 finds triggers 10 to 12, inclusive, all reset again. The revolution counter again begins its count of five RS pulses. At the beginning of ten revolutions, the inputs to OR 16 are again all up to place the output thereof down for one complete revolution, that is, the tenth revolution. Inverter 29 then provides the next 5RC pulse.

Each 5RC pulse is fed to the revolution accumulator and specifically is fed to the emitter-follower 30 and thence to the inputs of trigger 17. This series of triggers including triggers 17, 18, 19 and 20 functions as a binary serial counter in the same manner as triggers 10 to 12, inclusive, but counts only every fifth revolution. Consequently, when triggers 10 to 12, inclusive, have counted five RS pulses due to five revolutions of the drum, the count of triggers 17 to 20 is advanced by 1. The condition of each trigger 17 to 20, inclusive, during each critical revolution is as follows:

*Chart No. 2*

| BG | 1 | 2 | 3 | 4 | 5 | 6 | 7 | | 4 | 5 | 6 | 7 | 20 | |
|---|---|---|---|---|---|---|---|---|---|---|---|---|---|---|
| Word Input | x | x | I | 1 | 0 | 1 | 1 | Latch 42 | | | | | | Word A Incr |
| | | | | Tc 17 | Tc 18 | Tc 19 | Tc 20 | | | | | | | |
| Revolutions: | | | | | | | | | | | | | | |
| 5 | ---- | ---- | ---- | 1 | 0 | 0 | 0 | ---- | NC | NC | R | R | R | 1 |
| 10 | ---- | ---- | ---- | 0 | 1 | 0 | 0 | ---- | R | S | R | R | R | 1 |
| 15 | ---- | ---- | ---- | 1 | 1 | 0 | 0 | ---- | NC | S | R | R | R | 1 |
| 20 | ---- | ---- | ---- | 0 | 0 | 1 | 0 | ---- | R | NC | NC | R | R | 1 |
| 25 | ---- | ---- | ---- | 1 | 0 | 1 | 0 | ---- | NC | NC | NC | R | R | 1 |
| 30 | ---- | ---- | ---- | 0 | 1 | 1 | 0 | ---- | R | S | NC | R | R | 1 |
| 35 | ---- | ---- | ---- | 1 | 1 | 1 | 0 | ---- | NC | S | NC | R | R | 1 |
| 40 | ---- | ---- | ---- | 0 | 0 | 0 | 1 | ---- | R | NC | R | NC | R | 1 |
| 45 | ---- | ---- | ---- | 1 | 0 | 0 | 1 | ---- | NC | NC | R | NC | R | 1 |
| 50 | ---- | ---- | ---- | 0 | 1 | 0 | 1 | ---- | R | S | R | NC | R | 1 |
| 55 | ---- | ---- | ---- | 1 | 1 | 0 | 1 | ---- | NC | S | R | NC | R | 1 |
| 60 | ---- | ---- | ---- | 0 | 0 | 1 | 1 | ---- | R | NC | NC | NC | R | 1 |
| 65 | ---- | ---- | ---- | 1 | 0 | 1 | 1 | ---- | NC | NC | NC | NC | R | 1 |
| 70 | ---- | ---- | ---- | 0 | 1 | 1 | 1 | ---- | R | S | NC | NC | S | 0 |
| 75 | ---- | ---- | ---- | 1 | 1 | 1 | 1 | ---- | NC | S | NC | NC | S | 0 |

It can be seen from chart 2 that during the fifth revolution trigger 17 is set (indicating a binary 1) and triggers 18 to 20 are reset (indicating a binary 0). At the beginning of the tenth revolution, trigger 17 is reset and trigger 18 is set. Triggers 19 and 20 are reset. At the beginning of the fifteenth revolution, trigger 17 is set, trigger 18 is set, and triggers 19 and 20 are reset.

During the fifth revolution the set output of trigger 17 is down. Consequently, at BG4 time, negative AND 34 is unblocked and passes a negative pulse to negative OR 32. It should be noted at this time that all of the logical elements involved here are negative logical elements. OR 32 passes BG4 to inverter 33 to provide a positive pulse output to an input of AND 35. The positive pulse to inverter 36 is inverted to pass negative pulse BG4 to an input of AND 37.

During the tenth revolution, BG4 is blocked, since trigger 17 is reset; but BG5 passes through AND 31, since trigger 18 is set, providing a down level to AND 31. BG5 passes through negative OR 32 and inverter 33 provides a positive pulse to an input of AND 35. Inverter 36 passes a negative pulse to an input of AND 36. It can be seen from this that BG4 is fed to the serial comparator whenever trigger 17 is set (fifth, fifteenth, twenty-fifth revolution, etc.); BG5 is fed to the serial comparator whenever trigger 18 is set (tenth, fifteenth, thirteenth revolution, etc.); BG6 is fed through AND 38 to the serial comparator whenever trigger 19 is set (twentieth, twenty-fifth, thirteenth revolution, etc.), and BG7 is fed through AND 39 to the serial comparator whenever trigger 20 is set (fortieth, forty-fifth, fiftieth revolution, etc.).

Since we have assumed word A to be in accordance with chart 1, let us examine what happens in the serial comparator from BG4 to BG7, inclusive. During the fifth revolution at BG4 time, a pulse is fed to the serial comparator from trigger 17 of the revolution accumulator, and also from the input gating AND 40 to said serial comparator. The X clock pulse at BG4 time from AND 40 sets latch 41 to provide a down level at its set output to input B of AND 35, and an up level to an input of AND 37. The negative pulse BG4 from inverter 36 provides a down level to an input of AND 37. The inverter 33 provides a positive pulse at BG4 to an input of AND 35. At Y time then, both AND's 35 and 37 are blocked, and Y pulse does not reach latch 42. Latch 42 remains reset, having been previously reset in the previous cycle by BG22 pulse to its reset input. Consequently, the reset output of latch 42 is down, feeding a down level to AND 43. The 5RC pulse to AND 43 during the fifth revolution provides a down level to emitter-follower 44. Consequently, with a pulse from the word and a pulse from the revolution accumulator at BG4 time, the output of the serial comparator is down. If it should remain down at BG20, then emitter-follower 45 will pass BG20 pulse to the inputs of AND's 46, 47 and 48. Inverter 49 will pass a positive pulse at BG20 to inverter 50 which passes a negative pulse to AND's 51 to 55, inclusive, in the output drive circuit of the converter. Since we have selected word A for scanning, and since word A is constituted by word 2 in sector gate 3, then WG2 pulse and SG3 pulse are fed to AND 56. The down level output of AND 56 is fed to emitter-follower 57 and the down level output therefrom is fed to the inputs of AND's 51, 58 and 59. AND 51 is to provide the pulse train output. AND's 58 and 59 will provide the sign of the binary number and will be discussed later. It is only important at this time to see that a BG20 during word 2, sector 3, AND 51 passed BG20 to inverter 52 to provide a positive pulse on the INCR terminal.

It can be seen that this positive pulse output appears only if latch 42 remains reset at BG20 time. During the fifth revolution, at BG5, 6, and 7 time, as can be seen from chart 2, triggers 18, 19, and 20 are reset blocking these bit gate pulses from the serial comparator. At BG5 time, the word input is "0", at BG6 it is "1", and at BG7 it is also "1". At BG5 then, latch 41 (which has been reset by Z clock pulse during BG4 time) remains reset. This provides a down level to an input of AND 37. One input to AND 37 is up being connected to the output of inverter 36. Therefore, AND 37 is blocked at Y time. AND 35 is also blocked by the set output of latch 41 to an input of said AND gate. Consequently, at Y time of BG5, Y pulse is blocked at both AND's 35 and 37. Therefore, at BG5, latch 42 remains reset.

At BG6 time, a "1" input from the word sets latch 41 to unblock AND 35 at Y time. Y pulse is fed to the reset input to latch 42 which, however, is already reset so no change of the condition of this latch takes place. So, we can see that at BG6 time, latch 42 is still reset. The same logic occurs at BG7 time upon a "1" input from the word to the serial comparator. Latch 42 remains reset at BG7 time. Since latch 42 is reset at BG7 time, and since BG7 is the most significant bit position of the binary number being converted, then no further bits in the word will affect the condition of this latch. Consequently, from BG7 to BG22, latch 22 remains reset, and at BG20 time, a positive pulse is produced at INCR terminal during the fifth drum revolution.

We see from the above that whenever at a particular BG time the word introduces a "1", and the revolution accumulator introduces a "1" to the serial comparator, latch 42 receives no pulse input and remains reset. When a "0" from the word and a "0" from the accumulator is fed to the serial comparator, latch 42 also receives no pulse input and remains reset. With a "1" from the word and a "0" from the accumulator to the serial comparator, latch 42 receives a pulse on its reset input. The only condition that will set latch 42 is a "0" from the word and a "1" from the revolution counter to the serial comparator. This condition will be illustrated with reference to the tenth revolution, since it is at that time that it first occurs.

At the beginning of the tenth revolution, trigger 17 is reset, blocking BG4. However, trigger 18 is set, passing BG5 to the serial comparator. BG6 and BG7 are blocked in the accumulator, and consequently, the accumulator provides no pulse to the serial comparator during BG6 and BG7. Therefore, during the tenth drum revolution we have:

| | Word | Accumulator |
|---|---|---|
| BG4 | 1 | 0 |
| BG5 | 0 | 1 |
| BG6 | 1 | 0 |
| BG7 | 1 | 0 |

We have already seen that a "1" from the word and a "0" from the accumulator resets latch 42. However, at BG5 time, the combination is a "0" from the word and a "1" from the accumulator. With latch 41 reset at BG5 time providing a down level to an input of AND 37, AND 37 is unblocked at Y time due to the pulse output from the accumulator. This pulse output provides a down on an input of AND 37 since the output of I36 is then down. The Y pulse is fed through AND 37 to the set input of latch 42 to set said latch at BG5 time. However, as we have seen, a "1" from the word and a "0" from the accumulator at BG6 time will reset latch 42. BG7 also provides a reset pulse to latch 42 which, however, is already reset. So at BG7 time during the tenth revolution, latch 42 is reset and remains reset during BG20 time to provide a second pulse to INCR terminal of word A.

Now we have discussed every possible combination of word and accumulator inputs to the serial comparator. The effect of the various combinations on latch 42 is as follows:

| Word | Acc. | Latch 42 |
|---|---|---|
| 1 | 0 | Reset (R) |
| 1 | 1 | No change (NC) |
| 0 | 0 | No change (NC) |
| 0 | 1 | Set (S) |

Turning for a moment to chart 2, let us examine the progressive condition of latch 42 during each critical revolution. During the fifth revolution of BG4 time, trigger 17 is set (1) and triggers 18, 19 and 20 are reset (0). The condition of latch 42 during BG4 time experiences no change (NC) from its reset condition at BG22 during the previous word. Therefore, at BG4 time, latch 42 is reset. No change occurs during BG5 time. During BG6 time, a reset pulse is applied to latch 42 but it is already reset. During BG7, another reset pulse is applied to latch 42 but it is already reset. At BG20 time, latch 42 is reset providing a pulse (1) at word A (word 2, section 3) INCR terminal.

During the tenth revolution, trigger 17 is reset (0), trigger 18 is set (1), and triggers 19 and 20 are reset (0). Latch 42 receives a reset pulse at BG4 and remains reset, at BG5 it is set, at BG6 it is reset and remains reset at BG7. So at BG20 time, latch 42 is in the reset condition to provide another pulse (1) at word 1 INCR terminal.

If we examine progressively the condition of the latch 42 during the fifteenth, twentieth, twenty-fifth revolution, etc., we find the condition thereof as indicated in column BG20 of chart 2. During the fifth, tenth, fifteenth revolution, etc., through the sixty-fifth revolution, latch 42 is reset at BG20 time to provide a pulse (1) at the INCR terminal of word A. At the seventieth and seventy-fifth revolution, latch 42 is set at BG20 time providing no pulse (0) to the INCR terminal. If we add the total pulses provided during the total number of revolutions necessary to completely convert the binary number we find that there is a train of thirteen pulses produced on the INCR terminal for word A. This is the decimal analogue of the binary number represented in the word in BG4 to 7, inclusive, positions of the word at position word 2, sector 3 of the drum.

The same converting is done at BG20 for other word samplings. We have arbitrarily selected word 2, sector 3 for word A and word 4, sector 5 for word B, word 3, sector 6 for word C, word 4, sector 7 for word D, and word 5, sector 7 for word E. Others may be chosen. In addition, more words may be sampled by duplicating the word output circuits. In each case the proper word gate pulse and sector gate pulse is fed to AND's 56, 58, 59, 62 and 63.

At the end of each fifth revolution 5RC, WG7 and SG7 are fed to AND 64 to reset latch 65. Latch 65 is provided with a set pulse at BG22 during each word time. This provides a down level to inverter 66 and an up level to the D.C. reset inputs (DR) for triggers 10, 11 and 12. At 5RC, WG7 and SG7, latch 65 is reset to provide an up level to inverter 66 and a down level to each DR input to reset all of the binary triggers 10 to 12, inclusive. Also, at the end of the computation cycle (ECC) an ECC pulse is fed to AND 67 along with WG7 and SG7 to reset latch 65 to apply a negative reset pulse to the DR inputs to triggers 10 to 12, inclusive. The output of AND 67 is also fed to inverter 68 and inverter 69 to provide a negative reset pulse to each DR input of triggers 17 to 20, inclusive.

As we have said previously, BG3 of the word position provides the sign indicative of the sign of the binary number to follow. If there is a "1" in the BG3 position of the word, the output of AND 70 will be a "1" at this time and will set latch 71 which is reset at each BG22 time. This provides a down level to emitter-follower 72 and the output thereof applies a down level to input A of AND 47 to pass a BG20 pulse through inverter 73 and inverter 74 to AND 58. AND 58 at the selected word and sector time will provide a positive pulse from inverter 75 to the minus terminal of word 1. So, a "1" in BG3 position of the word indicates a minus number. The lack of a pulse at BG3 indicates by similar logic a positive or plus number, and the up level from emitter-follower 72 is inverted by inverter 76. The down level output of inverter 76 is fed to an input of AND 48. The up level of emitter-follower 72 blocks AND 47. BG20 then passes through AND 48, inverter 77, and inverter 78 through AND 59 to inverter 79 where a positive pulse appears on the plus terminal of word 1.

Figures 7, 9:
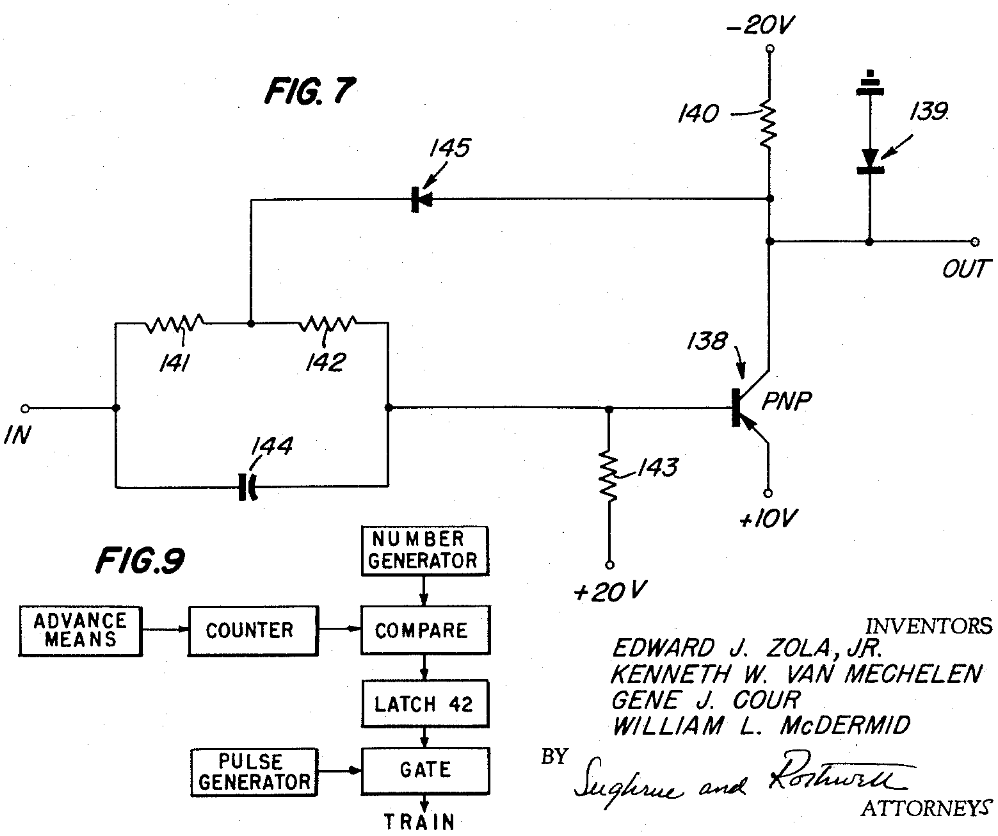
FIGURE 7 is another form of an inverter that may be employed in accordance with this invention and is identified in the drawings as I*pl*.
FIGURE 9 is a block diagram of one form of converter which may be employed in accordance with the present invention.

Referring for a moment to FIG. 9, it can be seen that the advance means includes the revolution counter which counts each revolution of the drum, one revolution being indicated by the generation of an RS pulse. Each fifth revolution of the drum, the revolution counter sends an advance pulse to the fifth revolution accumulator which functions as the counter illustrated in this figure. The count of the counter is compared with the value of the number produced by the number generator (the drum in this specific instance) in the compare unit which forms most of the serial comparator. Of course this comparison is bit by bit to thereby provide an indication of whether or not the count of the counter has exceeded the value of the number from the number generator. The latch 42 after the final bit comparison will find itself either in a set or reset state depending upon the results of the bit by bit comparison. The latch depending on its state will condition or de-condition the gate to permit the pulses generated by the pulse generator to pass therethrough to form the pulse train.

The example used here limits the converting to the first four significant bit positions of the word. However, the first 2, 3, 4, 5, 6, 7, etc., bit positions may be converted. In addition, the decoding need not start with the least significant bit position. Additionally, the revolution counter is shown as a five revolution counter and the accumulator as a fifth revolution accumulator. However, a two revolution counter and a second revolution accumulator, or a three revolution counter and a third revolution accumulator, etc., may be employed. Although the system has been illustrated employing a 5RC pulse indicating comparison of the number to the count of accumulator each fifth drum revolution, this is purely arbitrary. Conversion may be done as fast as desired. The limiting factor is the repetition rate of the bit gate pulses. The general formula is as follows:

$$\text{Time}=Kn$$

where

Time=time to convert the selected significant positions
$n$=number of pulses in the train
$K$=pulse period of said train.

In the particular case illustrated, $$\text{Time}=(50)(13)=650 \text{ milliseconds}$$

for conversion of the four significant positions indicative of binary 13. Since we have assumed that 1 drum revolution=10 ms., this means 65 drum revolutions for conversion. As shown by chart No. 2, it takes 65 drum revolutions to provide a train of 13 pulses. It should also be noted that for the conversion of $m$ significant bit positions, the accumulator should have $m$ counter stages.

The specific circuitry for the revolution counter as shown here need not be used. It is only necessary that it provide a count advancing pulse to the accumulator each drum revolution. A two-stage counter may be arranged to provide a pulse every two or three revolutions. A three-stage counter may be arranged to provide a pulse every two, three, four, five, six, or seven revolutions. A four-stage counter may be arranged to provide a pulse every two to fifteen revolutions etc.

The function of the serial comparator is to provide a pulse output at the selected INCR terminal as long as the count of the accumulator does not exceed the value of the number being converted. From this we see that for binary 1001 (9), the serial comparator will provide a pulse output at the selected INCR terminal until the accumulator count exceeds the binary value 9 (trigger 17 set, trigger 18 reset, trigger 19 reset, and trigger 20 set).

Figure 4:
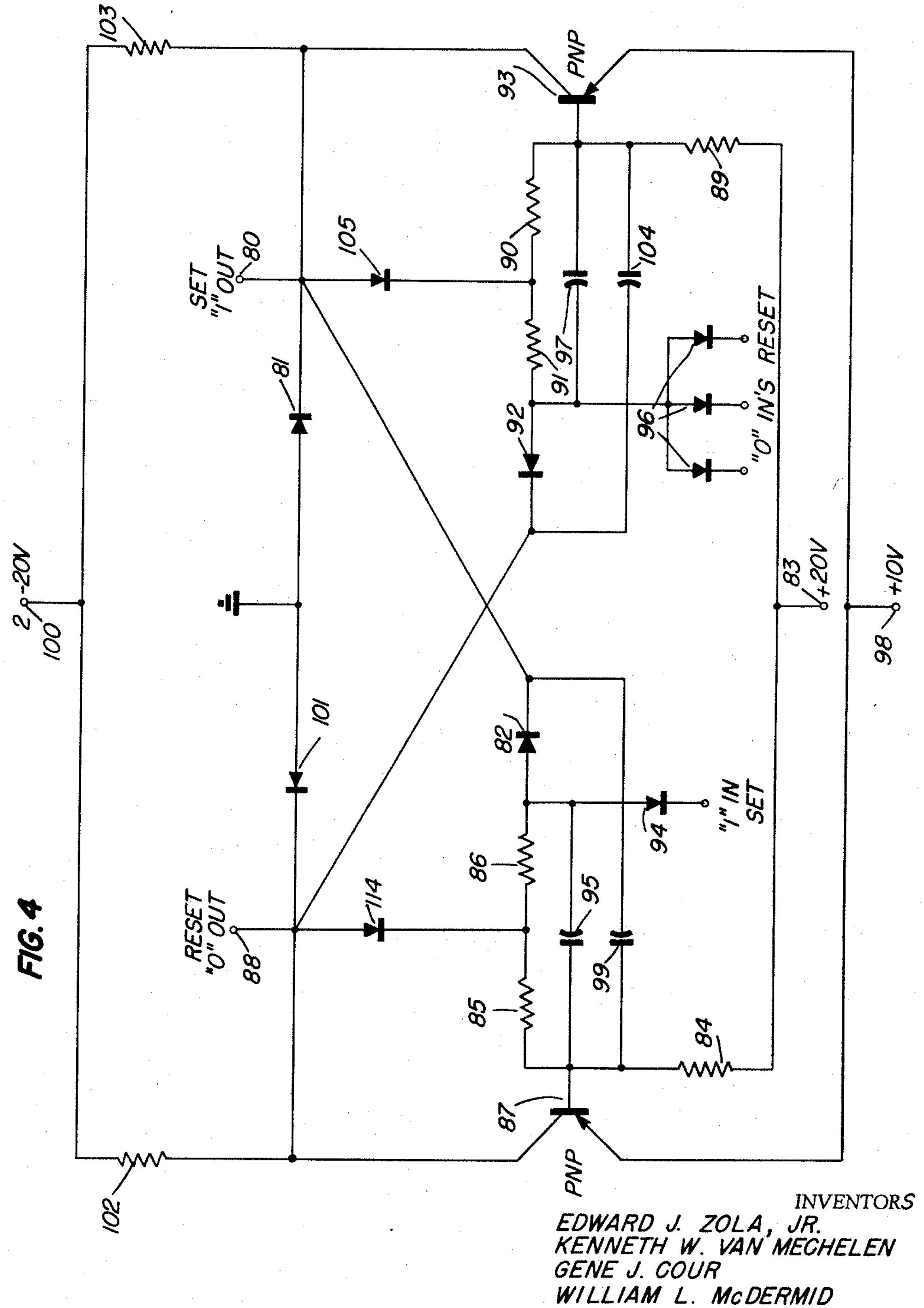
FIGURE 4 is a circuit diagram of one form of latch which may be used in this invention and is identified as L in the drawings.

FIGURE 4 illustrates one type of latch that may be used in accordance with this invention. This latch includes a PNP type transistor 87 and a PNP transistor 93. The emitter-electrodes of both transistors are connected to the lower P regions thereof and commonly connected to +10 v. at terminal 98. The collector-electrodes of both transistors are connected to the upper P regions thereof and respectively through resistor 102 and resistor 103 to −20 v. at terminal 100. The collector-electrode of transistor 87 is also connected to the Reset or 0 output terminal 88. This terminal is connected to the cathode of diode 101. The plate of diode 101 is connected to ground. The collector of transistor 93 is connected to the Set or "1" output at terminal 80 and to the cathode of diode 81. The plate of diode 81 is connected to ground. The voltage divider including resistors 84, 85 and 86 connected to +20 v. at terminal 83 determines the bias voltage applied to the base of transistor 87. The voltage divider including resistors 89, 90 and 91 connected to +20 v. at terminal 83, determines the bias voltage applied to the base of transistor 93. Diode 114 has its plate connected to the Reset output and its cathode connected to the junction of resistors 85 and 86 to prevent this junction from going below the voltage level of the Reset output. Diode 115 has its plate connected to the Set output and its cathode connected to the junction of resistors 90 and 91 to prevent this junction from going below the level of the Set output. The base of transistor 87 is coupled through condenser 95 to the plates of diodes 82 and 94 which together constitute an OR gate. The cathode of diode 94 is connected to the Set or "1" input terminal. The cathode of diode 82 is connected to the Set output. Condenser 99 couples the base of transistor 87 to the Set output. The base of transistor 93 is connected to the plates of diodes 92 and 96 together constituting an OR gate. The cathode of diode 92 is connected to the Reset output. This cathode is also connected to the base of transistor 93 through condenser 104.

Let it now be assumed that transistor 87 is conducting and transistor 93 is non-conducting. Under these conditions, the Reset output is at approximately +10 v. and diode 101 is non-conducting. Diode 94 is conducting and the voltage divider including resistors 84, 85 and 86 connected to +20 v. at terminal 83 provides a forward bias to transistor 87. The collector of transistor 93 is connected through the conducting diode 81 to ground. Diodes 96 are non-conducting and the voltage divider including resistors 89, 90 and 91 applies a reverse bias to transistor 93. With the latch in this condition, the application of a relatively negative voltage level to any of the diodes 96 will make transistor 93 conducting and the collector thereof will rise to approximately +10 v. This causes diode 81 to become non-conducting and the positive swing at the output terminal 80 is coupled through condenser 99 to the base of transistor 87 to make transistor 87 non-conducting. When transistor 87 becomes non-conducting, diode 101 becomes conducting and the Reset output at terminal 88 goes to ground. It can be seen then that the application of a negative pulse to the Reset input to the latch will cause a Set latch to provide a relatively high potential or up level at the Set output thereof and a relatively low or down level at the Reset output thereof. The latch becomes latched in this condition and further Reset pulses to the Reset input while the latch is in this condition will have no effect on its condition. On the other hand, a negative input to the Set input terminal of the latch will flip the Reset latch to a Set position to provide a down level at the Set output thereof and an up level at the Reset output thereof. Again, a latch in the Set condition is insensitive to further Set inputs thereto.

Figure 5:
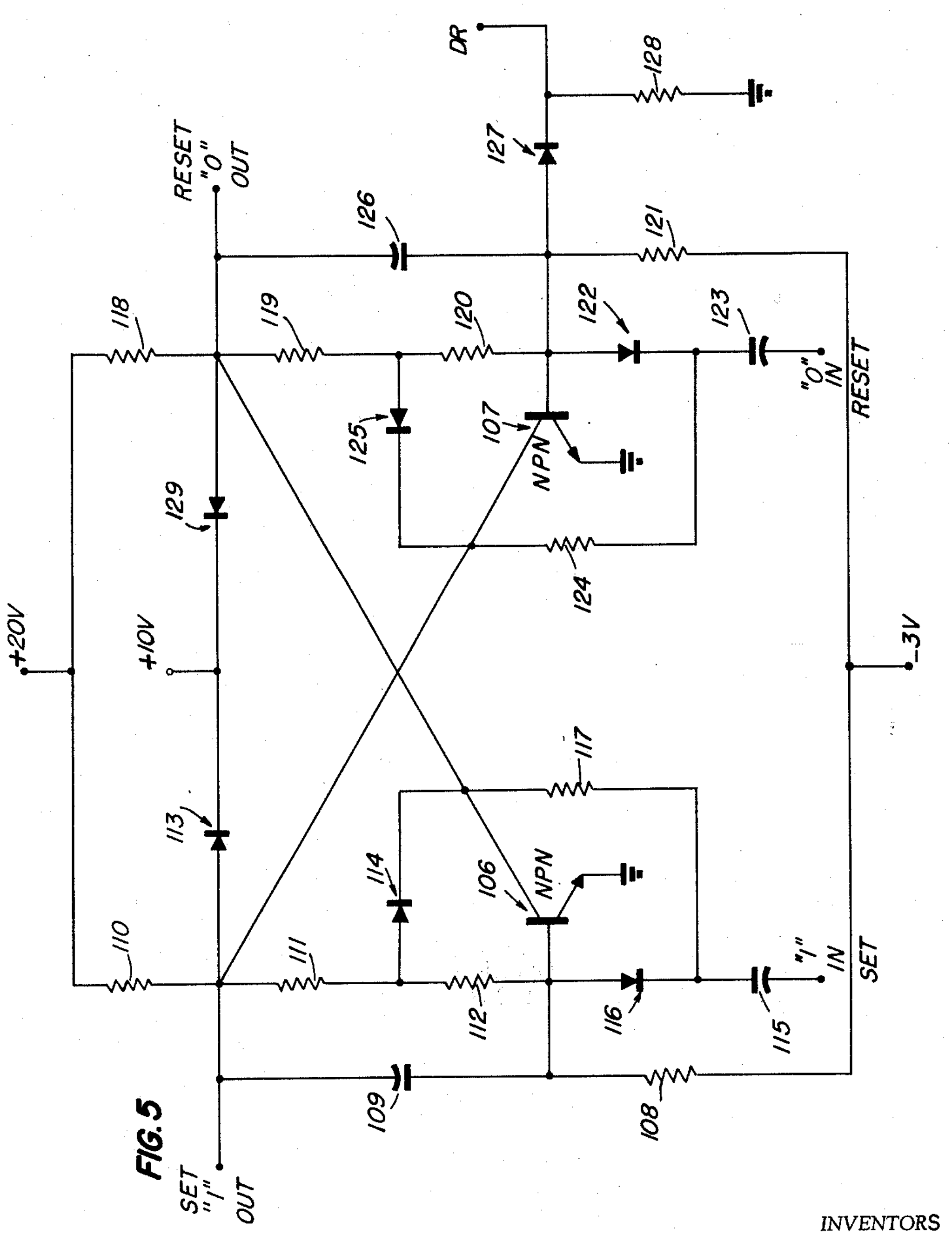
FIGURE 5 is a circuit diagram of a binary or counting trigger provided in accordance with this invention and is identified in the drawings by Tc.

Turning to FIG. 5, there is shown a circuit diagram of a complementary trigger which may be used in accordance with this invention. This complementary trigger functions similarly to the latch of FIG. 4. It is designed to provide a relatively down level at the Set output thereof when the trigger is Set by an input to its Set input and at the same time to provide a relatively up level at the Reset output thereof. Additionally, it will provide a relatively down level at the Reset output upon the application of a Reset signal to the Reset input thereof and at the same time provide a relatively up level at the Set output thereof. The circuit includes two NPN type transistors 106 and 107. The emitter-electrodes of both of these transistors are connected to the lower N regions thereof, and these electrodes are connected to ground. The collector-electrode of transistor 106 is connected to the upper N region thereof and to the Reset output. The collector-electrode of transistor 107 is connected to the upper N region thereof and to the Set output. The base of transistor 106 is connected to −3 v. D.C. through resistor 108. It is also connected to one side of condenser 109, the other side thereof being connected to the Set output. A voltage divider is positioned between +20 v. D.C. and −3 v. D.C. and includes resistors 110, 111, 112 and 108. This voltage divider sets the bias on the base of transistor 106. The base of transistor 106 is connected to the junction of resistors 112 and 108. Diode 113 has its plate connected to the Set output and its cathode connected to +10 v. Diode 114 has its plate connected to the junction of resistors 111 and 112 and its cathode connected to the collector of transistor 106. This diode prevents the junction of resistors 111 and 112 from rising above the potential of the Reset output. The Set input is applied through condenser 114 to the cathode of diode 116. The plate of diode 116 is connected to the base of transistor 106. The cathode of diode 116 is also connected through resistor 117 to the collector of transistor 106.

A voltage divider is also connected between +20 v. and −3 v. on the other side of the circuit and includes resistors 118, 119, 120 and 121. The base of transistor 107 is connected to the junction of resistors 120 and 121 and the bias voltage for said base is thereby obtained. The base is also connected to the plate of diode 122. The cathode of diode 122 is connected to one side of condenser 123 and the other side thereof is connected to the Reset input. The cathode of diode 122 is also connected through resistor 124 to the collector of transistor 107 and consequently to the Set output of the trigger. Diode 125 has its plate connected to the junction of resistors 119 and 120 and its cathode connected to the Set output and the collector of transistor 107. The base of transistor 107 is connected to one side of condenser 126 and the other side thereof is connected to the Reset output. An additional Reset input is applied at DR terminal which is connected to the cathode of diode 127. The plate of diode 127 is connected to the base of transistor 106. Resistor 128 is connected between the cathode of diode 127 and ground.

Let us now assume that the trigger is in the Set condition. In this condition, the Set or "1" output is at a relatively negative potential and transistor 107 is conducting and transistor 106 is nonconducting. Diode 113 is not conducting and diode 129 is conducting. The Reset output is at a relatively positive potential. The voltage divider including resistors 118, 119, 120 and 121 determines the bias on transistor 107. The voltage divider including resistors 110, 111, 112 and 108 determines the bias on transistor 106. Upon the application to the Set trigger of a relatively negative potential to the Reset input thereof, diode 122 becomes conducting and turns transistor 107 off. The collector thereof rises and diode 113 becomes conducting to place the Set output of the trigger at a relatively positive potential. Transistor 106 becomes conducting and the collector thereof goes toward ground. This causes diode 129 to become non-conducting, and the Reset output goes to a relatively negative potential. The trigger is then Reset. A relatively negative potential input to the Set input to the trigger will again Set the trigger. Upon the application of a relatively negative potential to the D.C. Reset input (DR), diode 127 will become conducting; and if the trigger is in the Set condition with transistor 107 conducting, the DR signal will drive the base of transistor 107 relatively negative with respect to its emitter to cause this transistor to become non-conducting. The Set output thereof will go up and the Reset output will go down, thus placing the trigger in the Reset condition.

Figure 6:
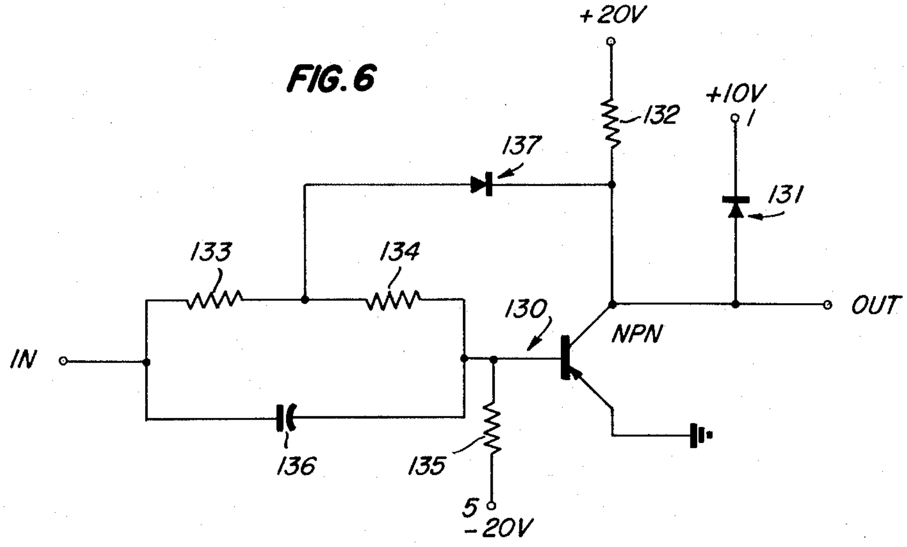
FIGURE 6 is a circuit diagram of one form of an inverter that may be employed in accordance with this invention and is identified in the drawings as I*n*.

In FIGURE 6 there is shown the circuit diagram for one form of inverter which may be used in accordance with this invention, and identified in the drawings as IN. An NPN type transistor 130 has an emitter-electrode connected to the lower N region thereof and said electrode is connected to ground. The collector-electrode is connected to the upper N region thereof and to the output terminal of the inverter. The output terminal is also connected to the plate of diode 131 whose cathode is connected to +10 v. D.C. The collector is connected to +20 v. through resistor 132. A voltage divider including resistors 133, 134 and 135 is connected between the input terminal and −20 v. The base of transistor 130 is connected to the voltage divider at the junction of resistors 134 and 135. This voltage divider determines the bias on the transistor 130. The input is also coupled to the base of transistor 130 through condenser 136. Diode 137 has its plate connected to the junction of resistors 133 and 134 and its cathode connected to the collector of transistor 130. This prevents the junction from going above the potential of the collector of transistor 130. When the input is at a relatively positive potential, transistor 130 is conducting and the output is at a relatively negative potential. Diode 131 is non-conducting. When the input terminal is at a relatively negative potential, transistor 130 is non-conducting, diode 131 is conducting and the output terminal is at a relatively positive potential.

In FIGURE 7, there is shown a circuit diagram of still another type of inverter which is identified in the drawing as I*pl*. Transistor 138 is a PNP type and has an emitter-electrode connected to the lower P region thereof and to +10 v. The collector-electrode is connected to the upper P region thereof and to the output terminal. The output terminal is connected to the cathode of diode 139 whose plate is connected to ground. The collector is also connected through resistor 140 to −20 v. The voltage divider between the input terminal and +20 v. including resistors 141, 142 and 143 determines the bias on the base of transistor 138. Condenser 144 also couples the input terminal to the base of transistor 138. Diode 145 has its cathode connected to the junction of resistors 141 and 142 and its plate connected to the collector of transistor 138 to prevent said junction from going below the voltage level of the collector. When the input terminal is at a relatively positive potential, transistor 138 is non-conducting, diode 139 is conducting placing the output terminal at a relatively negative potential. When the input terminal is at a relatively negative potential, transistor 138 is conducting, diode 139 is not conducting and the output terminal is at a relatively positive potential.

Figure 8:
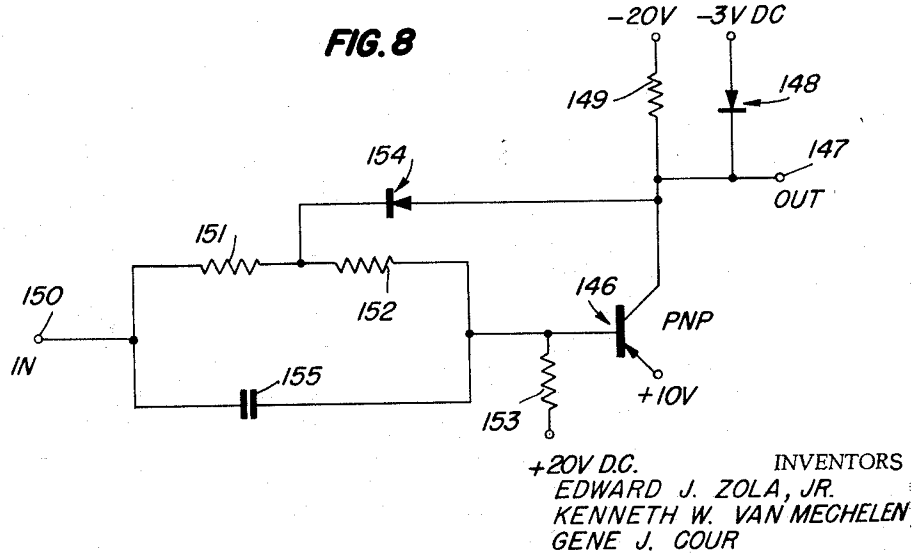
FIGURE 8 is a circuit diagram of still another form of inverter that may be used in accordance with this invention and is identified in the drawings as I*pdr*.

In FIGURE 8, there is shown a circuit diagram of still another form of inverter that may be used and indicated in the drawings as I*pdr*. Transistor 146 is a PNP type and has an emitter-electrode connected to the lower P region thereof and to +10 v. The collector-electrode is connected to the upper P region and to the output terminal 147. The output terminal is also connected to the cathode of diode 148 whose plate is connected to −3 v. The output terminal and the collector are connected through resistor 149 to −20 v. The voltage divider between the input terminal 150 and +20 v. D.C. includes resistors 151, 152 and 153, and this voltage divider determines the bias on the base of transistor 146. Diode 154 has its cathode connected to the junction of resistors 151 and 152 and its plate connected to the collector of transistor 146. This prevents that junction from going below the potential of the collector. The input terminal 150 is coupled to the base of transistor 146 through condenser 155. When the input terminal 150 is at a relatively positive potential, transistor 146 is not conducting, diode 148 is conducting and the output terminal of the inverter is at a relatively negative potential. With the input terminal 150 at a relatively negative potential, transistor 146 is conducting, diode 148 is not conducting and the output terminal 147 is at a relatively positive potential.

The above described circuitry is here used only as examples of circuitry that may be employed in accordance with this invention. No claim is made to the novelty of any of the circuitry and other circuitry which functions similarly may be used.

What has been described is one embodiment of the present invention. Other embodiments obvious from the teachings herein to those skilled in the art are contemplated to be within the spirit and scope of the following claims.

What is claimed is:

1. A converter for converting a number represented by the presence or absence of a pulse in each significant bit position thereof into a train of pulses equal in number to an analogue of said number that comprises: means to generate said number in digital form, a multistage counter, having at least one stage for each significant bit position of said number, means periodically to advance the count of said counter, means to compare sequentially the value of each significant bit position of said number to the value of each corresponding stage of said counter once each period, a pulse generator for generating pulses once each period, a gating circuit, means to feed said generated pulses to said gating circuit, gate conditioning means determined by said sequential compare means for conditioning said gating circuit to provide said pulse train and for deconditioning said gating circuit to terminate said pulse train.

2. A converter as defined by claim 1 wherein said comparison means includes means serially to compare each significant bit of said number with the state of its corresponding significant stage in said counter thereby to generate a first signal when the value of said number does not exceed the count of said counter and a second signal when the value of said number exceeds the count of said counter and means connecting said first and second signals to said gate conditioning means.

3. A converter as defined by claim 2 wherein said gate conditioning means includes a bistable latch having a set and reset state and a reset output, said first signal placing said latch in said reset state, said second signal placing said latch in said set state, and means connecting said reset output to said gating circuit whereby when said latch is placed in said reset state said gating circuit is conditioned to provide said pulse train and when said latch is placed in said set state, said gating circuit is deconditioned to terminate said pulse train.

References Cited in the file of this patent

UNITED STATES PATENTS

| | | |
|---|---|---|
| 2,568,724 | Earp et al. | Sept. 25, 1951 |
| 2,860,831 | Hobbs | Nov. 18, 1958 |
| 2,870,436 | Kuder | Jan. 20, 1959 |
| 2,894,254 | Mork | July 7, 1959 |
| 2,941,196 | Raynsford et al. | June 14, 1960 |